(12) United States Patent
Brolles et al.

(10) Patent No.: US 11,890,928 B2
(45) Date of Patent: Feb. 6, 2024

(54) ELECTRIC POWERTRAIN FOR A VEHICLE

(71) Applicant: VOLVO TRUCK CORPORATION, Gothenburg (SE)

(72) Inventors: Vincent Brolles, Saint Laurent de Mure (FR); Thomas Barillot, Mornant (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/808,904

(22) Filed: Jun. 24, 2022

(65) Prior Publication Data
US 2023/0011463 A1 Jan. 12, 2023

(30) Foreign Application Priority Data

Jul. 7, 2021 (EP) ..................................... 21184361

(51) Int. Cl.
*F16H 37/08* (2006.01)
*B60K 17/16* (2006.01)
*B60K 1/00* (2006.01)
*B60K 1/02* (2006.01)
*B60K 17/28* (2006.01)

(52) U.S. Cl.
CPC ................ *B60K 17/16* (2013.01); *B60K 1/00* (2013.01); *B60K 1/02* (2013.01); *B60K 17/28* (2013.01); *F16H 37/0806* (2013.01); *B60K 2001/001* (2013.01)

(58) Field of Classification Search
CPC ....... F16H 37/0806; B60K 17/28; B60K 1/02; B60K 17/04; B60K 17/16
See application file for complete search history.

(56) References Cited

U.S. PATENT DOCUMENTS

| 8,099,204 B2 * | 1/2012 | Snyder | B60K 6/365 |
| | | | 477/110 |
| 8,112,207 B2 * | 2/2012 | Heap | B60W 10/08 |
| | | | 477/181 |
| 9,527,382 B2 * | 12/2016 | Smetana | B60K 1/02 |

(Continued)

FOREIGN PATENT DOCUMENTS

CN 114475192 A * 5/2022
CN 114523836 A * 5/2022

(Continued)

OTHER PUBLICATIONS

DE 102018215924 A1 machine translation from espacenet.com (Year: 2023).*

(Continued)

*Primary Examiner* — Paul N Dickson
*Assistant Examiner* — Maxwell L Meshaka
(74) *Attorney, Agent, or Firm* — Venable LLP; Jeffri A. Kaminski

(57) ABSTRACT an electric powertrain integrated into a vehicle axle. Such electric axle (or "E-axle") is a front or rear axle that includes an axle body (or "housing") adapted to receive a powertrain, which is arranged to provide torque to the wheels of the axle. The "E-Axle" is a compact and economical electric drive solution for battery electric vehicles, fuel cells and hybrid applications. The electric motor(s), electronics and transmission are combined in a compact unit that directly drives the wheels provided at the longitudinal ends of the axle.

14 Claims, 5 Drawing Sheets

(56) References Cited

U.S. PATENT DOCUMENTS

| | | | |
|---|---|---|---|
| 9,656,659 B2* | 5/2017 | Shukla | F16H 3/728 |
| 10,435,026 B2 | 10/2019 | Shively et al. | |
| 10,960,749 B2* | 3/2021 | Rechenbach | B60K 6/547 |
| 11,052,750 B2* | 7/2021 | Hwang | B60K 6/36 |
| 11,235,662 B1* | 2/2022 | Shidore | F16H 3/085 |
| 11,247,563 B2* | 2/2022 | Van Dingenen | B60K 6/445 |
| 2009/0118950 A1* | 5/2009 | Heap | B60W 10/10 |
| | | | 701/55 |
| 2009/0118964 A1* | 5/2009 | Snyder | B60W 20/19 |
| | | | 701/99 |
| 2010/0087996 A1* | 4/2010 | Haggerty | B60W 10/08 |
| | | | 903/945 |
| 2015/0151634 A1* | 6/2015 | Smetana | B60K 17/16 |
| | | | 475/150 |
| 2017/0246947 A1* | 8/2017 | Kotloski | B60W 30/192 |
| 2020/0055385 A1* | 2/2020 | Rechenbach | B60K 6/387 |
| 2020/0055391 A1 | 2/2020 | Kumar et al. | |
| 2020/0262293 A1* | 8/2020 | Glückler | B60K 17/06 |
| 2021/0023931 A1* | 1/2021 | Hwang | F16H 3/085 |
| 2021/0362593 A1* | 11/2021 | Van Dingenen | B60K 6/365 |
| 2022/0032755 A1* | 2/2022 | Seemann | B60K 7/0007 |
| 2022/0185086 A1* | 6/2022 | Wössner | B60K 17/28 |
| 2022/0250457 A1* | 8/2022 | Glückler | B60K 17/06 |
| 2022/0364632 A1* | 11/2022 | Shim | B60K 17/08 |
| 2023/0078446 A1* | 3/2023 | Wechs | B60K 17/16 |
| | | | 475/5 |
| 2023/0117280 A1* | 4/2023 | Wang | B60K 1/00 |
| | | | 475/5 |

FOREIGN PATENT DOCUMENTS

| | | | |
|---|---|---|---|
| CN | 115704462 A | * | 2/2023 |
| DE | 102015206190 A1 | | 10/2016 |
| DE | 102018203456 A1 | * | 9/2019 |
| DE | 102018119488 A1 | | 2/2020 |
| DE | 102018215924 A1 | | 3/2020 |
| DE | 102018222251 A1 | | 6/2020 |
| DE | 102018222257 A1 | * | 6/2020 |
| DE | 102019210511 A1 | * | 1/2021 |
| KR | 20220120783 A | * | 8/2022 |
| WO | 202058109 A1 | | 3/2020 |
| WO | 2020182933 A1 | | 9/2020 |
| WO | 2020197463 A1 | | 10/2020 |
| WO | 2020256618 A1 | | 12/2020 |

OTHER PUBLICATIONS

European Search Report in corresponding European Application No. 21184361.0 dated Oct. 29, 2021 (3 pages).

* cited by examiner

| Combination | EM 1 | EM 2 | Cruise gear |
|---|---|---|---|
| 1 | Gear 1 | Neutral | Neutral |
| 2 | Neutral | Gear 2 | Neutral |
| 3 | Gear 3 | Neutral | Neutral |
| 4 | Neutral | Gear 4 | Neutral |
| 5 | Gear 1 | Gear 2 | Neutral |
| 6 | Gear 1 | Gear 4 | Neutral |
| 7 | Gear 3 | Gear 2 | Neutral |
| 8 | Gear 3 | Gear 4 | Neutral |
| 9 | Neutral | Neutral | Engaged |
| 10 | Neutral | Gear 4 | Engaged |
| 11 | Neutral | Gear 2 | Engaged |
| 12 | Neutral | Neutral | Neutral |

ELECTRIC POWERTRAIN FOR A VEHICLE

TECHNICAL FIELD

The invention relates to an electric powertrain for a vehicle.

Typically, the invention applies to an electric powertrain integrated into a vehicle axle. Such electric axle (or "E-axle") is a front or rear axle that includes an axle body (or "housing") adapted to receive a powertrain, which is arranged to provide torque to the wheels of the axle. The "E-Axle" is a compact and economical electric drive solution for battery electric vehicles, fuel cells and hybrid applications. The electric motor(s), electronics and transmission are combined in a compact unit that directly drives the wheels.

The invention can be applied in low-duty, medium-duty and heavy-duty vehicles, such as trucks, buses and construction equipment, as well as in passenger cars. Although the invention will be described with respect to a truck, the invention is not restricted to this particular vehicle type. Indeed, the electric powertrain of the invention could also be used in watercrafts such as ships or boats.

BACKGROUND

The transport industry is currently in the process of transition to electro-mobility, which implies the use of electric power to drive vehicles. Electro-mobility is mainly developed to meet increasingly stringent emission regulation requirements and the banning of internal combustion engine vehicles by some cities.

In order to free as much space as possible for batteries, chassis and other large parts, such as aerodynamic profiles, the powertrain must be as compact as possible.

Most electric motors have an ideal operating range that is achieved at high speed and low torque, while internal combustion engines have an ideal operating range that is achieved at low speed and high torque. In order to meet the torque demand at the wheels, typically for hill starts or high load starts, a relatively high reduction ratio (usually between 20 and 50) between the electric motor and the wheels is required. This reduction ratio can only be achieved with several reduction stages, which requires space.

The problem with using a gearbox with a fixed speed ratio is that the electric motor would run at high speed and low torque in cruise mode conditions and that in such conditions, the efficiency of the motor is not optimal. In addition, high-speed conditions also increase stresses on the gears, bearings and sealing rings of the transmission, which reduces the durability of the transmission.

In addition, a gearbox with gears rotating at high speed also creates lubrication problems. Indeed, a gear rotating too fast may not be lubricated properly since the oil between two successive teeth is ejected by centrifugal force and metal-to-metal contact may occur between the teeth of the two gears in mesh, which generates heat and, consequently, potentially irreversible mechanical damage.

High rotation speed is also generally creating more noise and vibrations. This can be problematic from regulation perspectives and for customers (both drivers and persons outside the vehicle).

Additionally, the conventional electric powertrain cannot be adapted to a wide range of vehicle including low-duty vehicles, medium-duty vehicles and heavy-duty vehicles. Thus, vehicles manufacturers have to develop and/or supply themselves with a wide range of electric powertrains, each powertrain corresponding to one kind of vehicle. The production cost is therefore significantly high and the manufacturing method is not optimized.

Furthermore, it is known to use a power take-off for taking power from an electric powertrain and transmitting it to an external machine.

The document WO2020182933 discloses an electric drive unit for a vehicle, in particular a self-propelled work machine with a carrier vehicle and an integrated or removable work device. The drive unit comprises a power split gear; a planetary gear with the rotatable elements; two drive sources, each of which is operatively connected to one of the other two of the rotatable elements of the planetary gear and can drive it; a controller that can centrally control the two drive sources independently of each other wherein two electric machines correspond to drive sources and at least one power take-off is operatively connected to one of the two electric machines.

However, conventional electric powertrains do not offer a wide range of possibilities to connect an electric powertrain to a power take-off. Moreover, conventional electric powertrains including power take-off are usually complex and a plurality of power take-off is needed to transmit the desired power to an external machine.

It is to these disadvantages that the invention aims more particularly to remedy, by providing a more compact and robust electric powertrain including a power take-off, and making it possible to ensure a better efficiency of the electric motor in many conditions by offering several gear ratios. Additionally, the invention aims to provide an electric powertrain that can be easily adapt on a wide range of vehicles.

SUMMARY

Thus, the architecture of the electric powertrain is adapted to one kind of vehicle, in particular to the vehicle load, the vehicle architecture, the vehicle topography, the customers' expectations and the vehicle application. Furthermore, the architecture of the electric powertrains according to the present invention is optimized to include a power take-off and offers a better efficiency. Consequently, the electric powertrains according to the present invention allow for an optimized manufacturing method, a reduction of the production costs, an increased productivity and a better efficiency. Moreover, the power take-off is directly connected to the first or the second electric motor with a fixed ratio cascade or direct drive. The speed and the torque of the power take-off and of the first or the second electric motor are controlled separately. The speed and the torque of the power take-off are therefore independent from the speed of the vehicle.

According to the present invention, the power take-off PTO includes any other auxiliary components such as: an oil pump or a hydraulic pump.

According to one embodiment, the first gear module is arranged in a first gear casing, the second gear module is arranged in a second gear module casing.

According to one embodiment, the first gear casing and the second gear casing are adjacent.

According to one embodiment, the first gear module is arranged in a first gear casing, the second gear module is arranged in a second gear module casing and the third gear module is arranged in a third gear casing.

According to one embodiment, the first gear casing, the second gear casing and the third gear casing are adjacent.

According to one embodiment, the first gear module, the second gear module and the third gear module are adjacent and are arranged within a common casing.

According to one embodiment, the second gear module is arranged in a second gear casing and the third gear module is arranged in a third gear casing.

According to one embodiment, the second gear casing and the third gear casing are adjacent.

According to one embodiment, the second gear module and the third gear module are adjacent and are arranged within a common casing.

According to one embodiment, the electric powertrain comprises a control device configured to control the first and/or the second electric motors.

According to one embodiment, the electric powertrain comprises at least one hub reduction.

The object is finally achieved by an electric, fuel cell or hybrid vehicle comprising an electric powertrain according to the present invention. Thanks to the architecture of the electric powertrain including the power take-off, the electric powertrain according to the present invention is more compact allowing a mass saving and an optimized architecture. The electric powertrain can therefore be implemented in a wide range of vehicles.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present description is given in an X, Y, Z referential where X is defined as the longitudinal direction of the vehicle 1, Y is defined as the transversal direction and Z is defined as the vertical direction of the vehicle 1.

Figure 1:
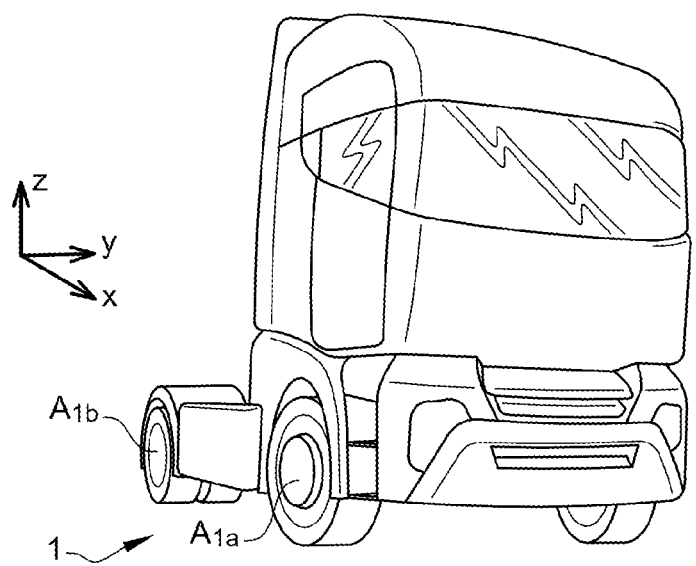
FIG. 1 is a perspective view of a vehicle, comprising an electric powertrain according to the invention, said powertrain being integrated into one of the axles of the vehicle, called "E-axle"

FIG. 1 shows a vehicle, which is an electric, fuel cell or hybrid vehicle, i.e. a vehicle using electric energy as a source of power. In the example, the vehicle is a truck 1, comprising two axles $A_{1a}$ and $A_{1b}$, respectively a front axle $A_{1a}$ and a rear axle $A_{1b}$.

In an alternative embodiment, the vehicle may include one or more front and/or rear axle(s). Each axle can alternatively be none driven or driven axle(s).

At least one of the two axles $A_{1a}$ and $A_{1b}$ is motorized, i.e. includes at least one electric motor. In the example, we consider that only the rear axle $A_{1b}$ is motorized, i.e. vehicle 1 is a propulsion vehicle (in which only the rear axle(s) is/are motorized). However, the invention obviously also applies to all-wheel drive vehicles and to traction vehicles (in which only the front axle(s) is/are motorized).

Axle A1b includes a powertrain 2a, 2b, 2c, comprising a first electric motor (or "E-motor") EM1, a first and a second electric motor EM1, EM2 or a second electric motor EM2. In the Example, the two motors EM1 and EM2 are identical in that they have the same characteristics (supply voltage, operating current, torque-speed characteristic, mechanical power, etc.). For example, the mechanical power of EM1 and EM2 are between 50 kW to 500 kw. Alternatively, the two motors EM1 and EM2 can be different.

Advantageously, the electric motors EM1 and EM2 are AC type motors (synchronous or asynchronous). Alternatively, the electric motors EM1 and EM2 could be DC type motors as well (brushed). More generally, any electric motor is suitable.

Figure 2:
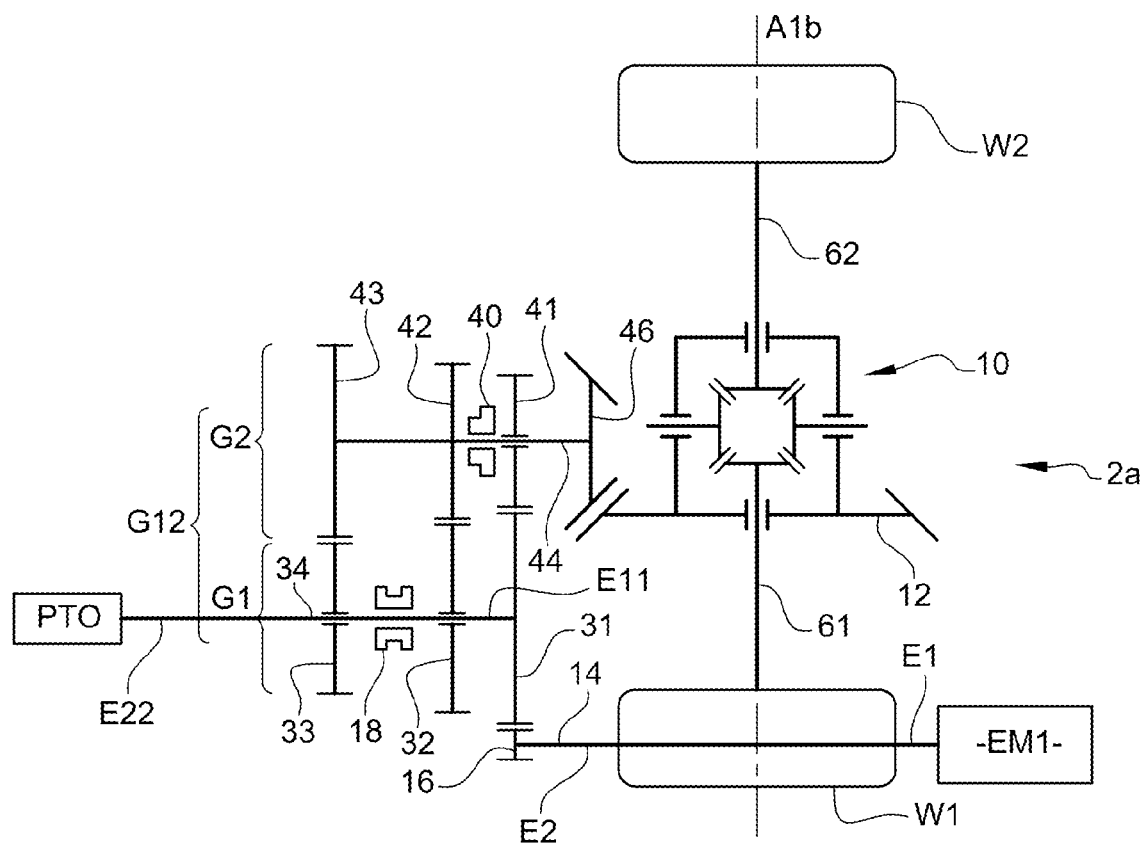
FIG. 2 is a schematic representation of the electric powertrain according to the one embodiment.
Figure 3:
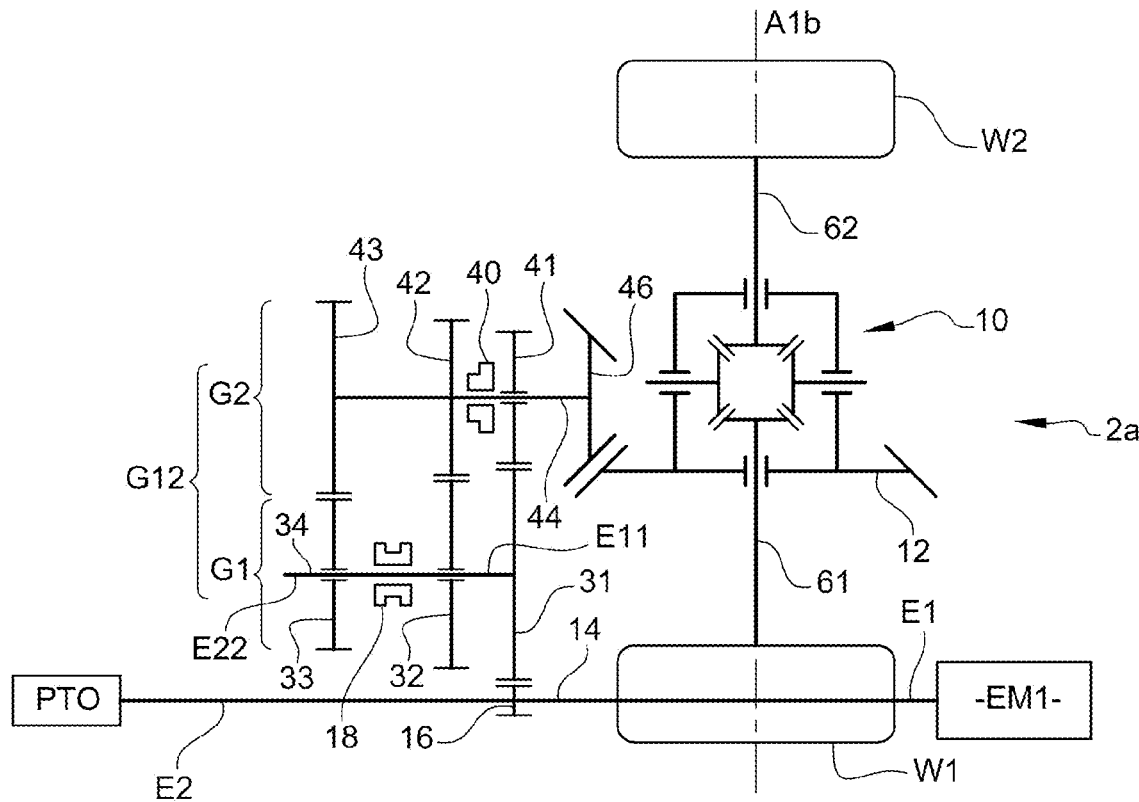
FIG. 3 is a schematic representation of the electric powertrain according to the one embodiment.

As shown on FIGS. 2 and 3, in one embodiment, the invention relates to an electric powertrain 2a for a vehicle 1 comprising a first primary gear 31, a second primary gear 32 and a third primary gear 33 arranged on a primary shaft 34 to obtain a first gear module G1 and a first electric motor EM1 linked to the first gear module G1. The first electric motor EM1 comprises a motor shaft (or "rotor shaft") 14 on which may be arranged a pinion 16 meshing with the first primary gear 31.

Typically, pinion 16 is fixed in rotation with motor shaft 14. For example, pinion 16 can be integral with shaft 14, meaning that pinion 16 and shaft 14 form a unique part. The motor shaft 14 comprises a first extremity E1 and a second extremity E2. The primary shat 34 has a first extremity E11 and a second extremity E22, said first primary gear 31 being located at the first extremity E11 of the primary shaft 34.

The electric powertrain 2a further comprises a first secondary gear 41 meshing with the first primary gear 31, a second secondary gear 42 meshing with the second primary gear 32, a third secondary gear 43 meshing with the third primary gear 33; said first secondary gear 41, second secondary gear 42 and third secondary gear 43 being arranged on a secondary shaft 44, also called "output shaft", to obtain a second gear module G2.

The first gear module G1 is arranged in a first gear casing (not shown) and the second gear module G2 is arranged in a second gear casing (not shown), said first gear casing and the second gear casing being adjacent. The first gear module G1 and the second gear module G2 are arranged to obtain a gearbox G12. In this example, the first secondary gear 41 is by default free to rotate around the secondary shaft 44. In an alternative embodiment, the first gear module G1 and the second gear module G2 are arranged in a common gear casing (not shown).

In this electric powertrain 2a, the primary first primary gear 31 is fixed in rotation with respect to the primary shaft 34, the second primary gear 32 and a third primary gear 33. The primary first primary gear 31, the second primary gear 32 and a third primary gear 33 have each a different (outer diameter) and/or a different number of teeth. Typically, the primary first primary gear 31 has a diameter which is greater than that of the second primary gear 32 and the second primary gear 32 has a diameter that is greater than that of the third primary gear 33.

In the example, the first primary gear 31 is integral with shaft 34 (i.e. made in one-piece). However, the first primary gear 31 could be fixedly attached to shaft 34 as well, using fasteners, welding, splines or press-fitting or any other means. Besides, the second primary gear 32 and the third primary gear 33 are, in this particular arrangement, by default each free to rotate around primary shaft 34.

The electric powertrain 2a further comprises a differential 10 connected to EM1. When configuring the electric powertrain 2a, for example, the axle A1b has an elongated transmission housing (not shown). This transmission housing includes a central part receiving the differential 10 and two lateral parts extending on either side of the central part. The two lateral parts receive the two drive shafts 61 and 62 respectively connected to the wheels W1 and W2. The electric motor EM1 is arranged so as to transmit a driving torque (or motor torque) to the drive shafts 61, 62 via the crown wheel 12 of the differential 10.

In this embodiment, EM1, the differential 10 and the gearbox G12 are arranged to obtain a transmission unit. The gearbox G12 includes a multiple speed ratio.

Typically, the motor EM1 is attached to the transmission housing by any appropriate means and in particular by bolting. Such fastening means are known as such, that is why they are not shown on the figures. Alternatively, the housing of the electric motor EM1 is integral with the transmission housing.

Advantageously, the first electric motor EM1 is offset from a longitudinal direction of the vehicle.

Preferably, the axis of rotation of electric motor EM1 is parallel to the longitudinal direction of the vehicle. Accordingly, the powertrain 2a is said to be in a longitudinal configuration relative to the axle.

The gearbox G12 also includes a first coupling member 40 (also known as "gear shifting mechanism" or "dog clutch element"), which is arranged along the secondary shaft 44 and which can be moved between an engaged position, in which it couples the first secondary gear 41 in rotation with the secondary shaft 44 and a neutral position, in which it allows the first secondary gear 41 to rotate freely around the secondary shaft 44.

The gearbox G12 also includes a second coupling member 18, which is arranged along one shaft among the primary and secondary shafts 34, 44, typically along shaft 34, and which is movable between a first position in which it couples the second primary gear 32 in rotation with primary shaft 34, a second position in which it couples the third primary gear 33 in rotation with primary shaft 34 and a neutral position in which it does not prevent the second and third primary gears 32, 33 from rotating around primary shaft 34.

In one alternative embodiment, the second coupling member 18 could be arranged along the secondary shaft 44. In this case, the second coupling member 18 would be movable between a first position in which it would couple the second secondary gear 42 in rotation with secondary shaft 44, a second position in which it would couple the third secondary gear 43 in rotation with secondary shaft 44 and a neutral position in which it would not prevent the second and third secondary gears 42, 43 from rotating around secondary shaft 44.

Preferably, at least one of the first coupling member 40 and the second coupling member 18 (preferably both coupling members 18 and 40) is a dog clutch.

Advantageously, a first speed ratio ("EM1 gear 1") is obtained when the first coupling member 40 is in neutral position and when the second coupling member 18 is in the second position. In this configuration, the torque is transmitted from the primary shaft 34 to the secondary shaft 44 through the pair of gears 33 and 43. The other gears, i.e. gears 32 and 41, are respectively unclutched from shafts 34 and 44. This means that the rotation speed of gear 32 is independent from that of shaft 34 and that the rotation speed of gear 41 is independent from that of shaft 44. In other words, gears 33 and 41 are free to rotate around shaft 34 and 44, respectively. Nevertheless, it does not mean that gears 32 and 41 remain immobile: Gears 32 and 42 are respectively rotationally driven by gears 43 and 31, which are each fixed in rotation with shaft 44 and 34, respectively.

Advantageously, a second speed ratio ("EM1 gear 3"), different from the first speed ratio, is obtained when the first coupling member 40 is in neutral position and when the coupling member 18 is in first position. In this configuration, the torque is transmitted from the primary shaft 34 to the secondary shaft 44 through the pair of gears 32 and 42. The other gears, i.e. gears 33 and 41, are respectively unclutched from shafts 34 and 44. This means that the rotation speed of gear 33 is independent from that of shaft 34 and that the rotation speed of gear 41 is independent from that of shaft 44. In other words, gears 33 and 41 are free to rotate around shaft 34 and 44, respectively. Nevertheless, it does not mean that gears 32 and 41 remain immobile: Gears 33 and 41 are respectively rotationally driven by gears 43 and 31, which are each fixed in rotation with shaft 34 and 44, respectively.

Advantageously, a third speed ratio ("EM1 cruise gear"), different from the first two speed ratios, is obtained when the first coupling member 40 is in the engaged position and the second coupling member 18 is in the neutral position. In this configuration, the torque is transmitted from the primary shaft 34 to the secondary shaft 44 through the pair of gears 31 and 41. The other gears, i.e. gears 32 and 33, are unclutched from shaft 34. This means that the rotation speeds of gears 32 and 33 are independent from the rotation speed of the shaft 34. In other words, gears 32 and 33 are free to rotate around shaft 34. Nevertheless, it does not mean that gears 32 and 33 remain immobile: Gears 32 and 33 are respectively rotationally driven by gears 42 and 43, which are fixed in rotation with shaft 44.

The speed ratio of gearbox G12 can be defined as the quotient between the rotational speed of the output gear 46 and the rotational speed of gear 16. The first speed ratio is lower than the second speed ratio, which is, itself, lower than the third speed ratio (cruise gear ratio). Typically, the first speed ratio is about 1:16, the second speed ratio is about 1:10 and the third speed ratio is about 1:7.

Typically, the first speed ratio can be selected at low speeds, i.e. at vehicle start, the second speed ratio can be selected at medium speeds and the third speed ratio can be selected at high speeds. It is to be understood that the transmission ratio of the gearbox G12 is automatically modified according to the vehicle speed.

In addition, if both coupling members 18 and 40 are put in neutral position, then no torque will be transmitted by the electric motor EM1 to the wheels.

In the example, the gearbox G12 therefore has at least three different speed ratios (three-speed gearbox). It is to be noted that only three gears are arranged on the primary shaft 34 of the gearbox G12, which is uncommon for a three-speed gearbox: Indeed, a three-speed gearbox usually includes an input shaft on which are arranged one input gear (to be connected to the driving source) and three distribution gears of different diameter to achieve the three speed ratios, i.e. fourth gears. This enables having a very compact gearbox, in particular in the longitudinal direction of the transmission.

In one alternative embodiment, the second and third secondary gears 42, 43 arranged along the secondary shaft 44 are by default each free to rotate around said secondary shaft 44. In this case, a third coupling member would be arranged along secondary shaft 44 and would be movable between a first position in which it would couple the second gear 42 in rotation with secondary shaft 44, a second position in which it would couple the third gear 43 in rotation with secondary shaft 44 and a neutral position in which the second and third gears 42, 43 can rotate around the secondary shaft 44. The advantage of having a third coupling member is that there is no need to lubricate the gear contact of the gear set 32, 42 or 33, 43 when it does not transmit any torque. The fact that these gear sets will not rotate will limit oil churning and friction losses at the gear contact. This also reduces wear on the gears teeth, making the gearbox G12 more robust (or more durable).

Indeed, the third coupling member would allow to use only the pair of gears that transmit the torque (32 and 42 for instance) and to avoid that the other gears (33 and 43 for instance), which do not transmit any torque, rotate. When the second coupling member 18 is in neutral position, the third coupling member could also be put to neutral, so that none of the gears 32, 42, 33 and 43 would rotate.

A power take-off PTO is connected to the first electric motor EM1. As shown is FIG. 2, the power take-off PTO may be located at the second extremity E22 of the primary shaft 34. For example, a gear arranged on the second extremity E22 of the primary shaft 34 meshes with a gear of the PTO. A coupling member, in particular a clutch, may be located between the power take-off PTO and the primary shaft 34.

FIG. 3 illustrates an example wherein the power take-off PTO is located at the second extremity E2 of the motor shaft 14. For example, a gear arranged on the second extremity E2 of the motor shaft 14 is meshing with a gear of the PTO. A coupling member, in particular a clutch, may be located between the power take-off PTO and the motor shaft 14.

Figure 4:
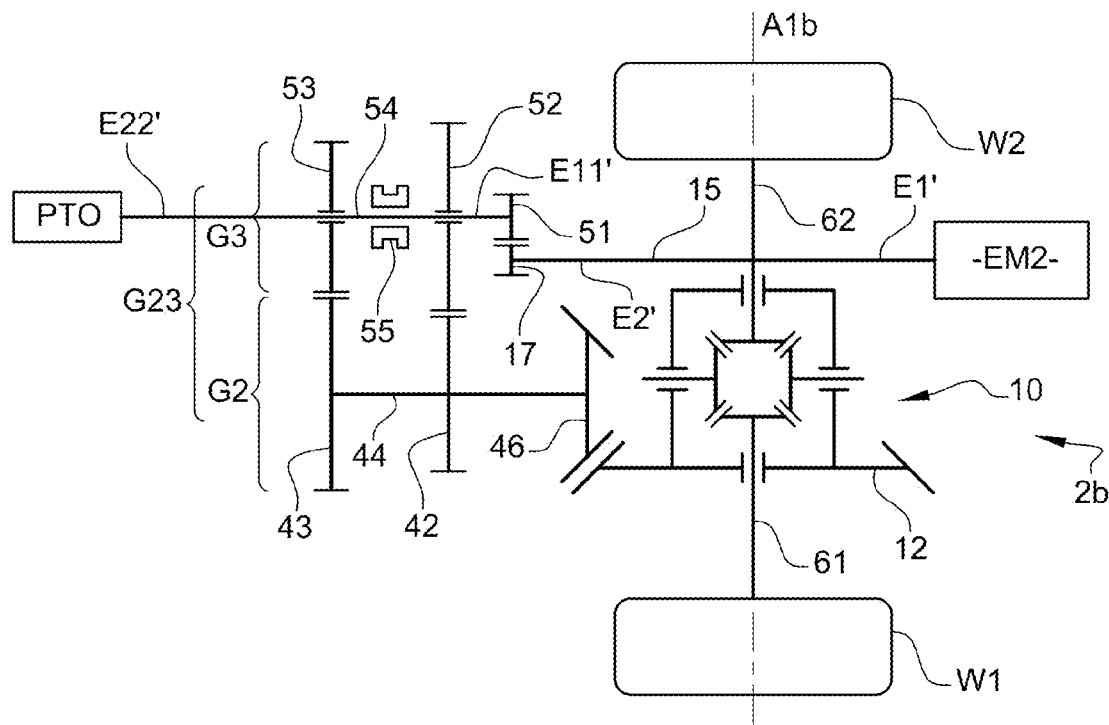
FIG. 4 is a schematic representation of the electric powertrain according to the one embodiment.
Figure 5:
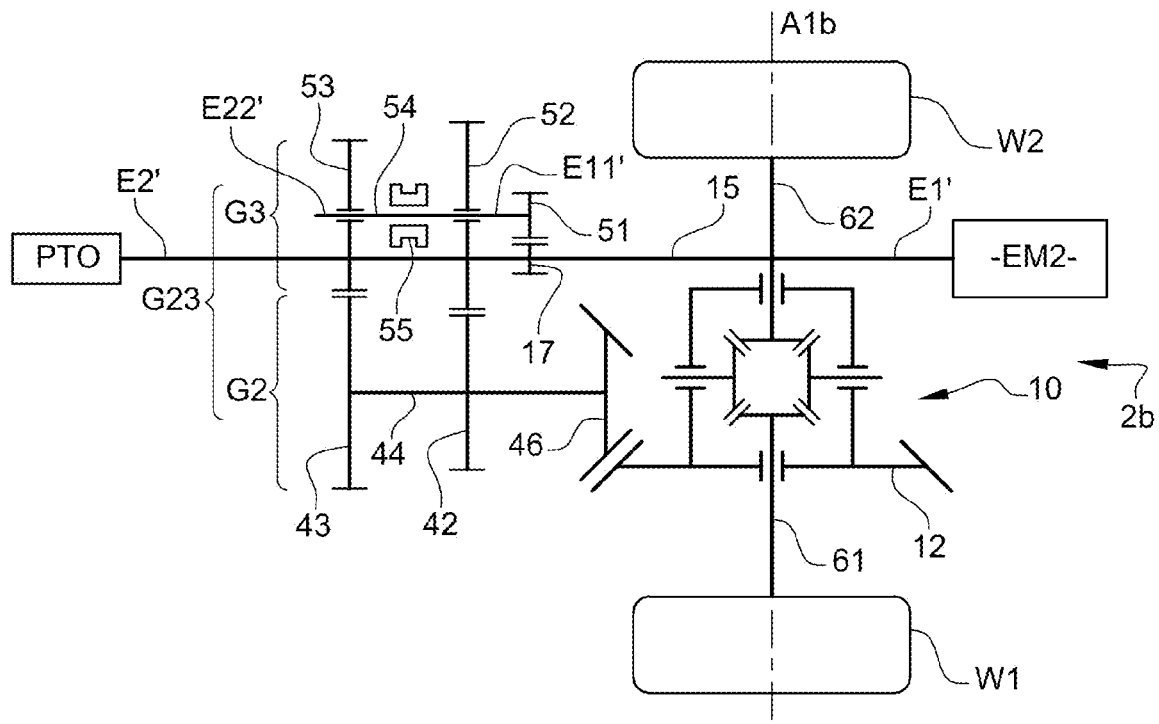
FIG. 5 is a schematic representation of the electric powertrain according to the one embodiment.

As shown on FIGS. 4 and 5, in another embodiment, the invention relates to an electric powertrain 2b for a vehicle 1 comprising a first tertiary gear 51 configured to be fixed in rotation with respect to the tertiary shaft 54, a second tertiary gear 52 and a third tertiary gear 53 are arranged on the tertiary shaft 54. The first tertiary gear 51, the second tertiary gear 52 and the third tertiary gear 53 are arranged adjacent on the tertiary shaft 54 to obtain a third gear module G3. In the example, the second tertiary gear 52 and a third tertiary gear 53 are by default free to rotate around the tertiary shaft 54.

The second tertiary gear 52 meshes with the second secondary gear 42 fitted on secondary shaft 44 and the third input gear 53 meshes with the third secondary gear 43. Contrary to the configuration of the first gearbox G12, the first input gear 51 does not mesh with any secondary gear, in particular with the first secondary gear 41. Indeed, the first secondary gear 41 is not present on the secondary shaft 44.

In the particular embodiment of the figures, the second electric motor EM2 comprises a motor shaft 15 having a first extremity E1' and a second extremity E2'. A pinion 17 is arranged on its second extremity E2' and is meshing with the first tertiary gear 51 located at the first extremity E11' of the tertiary shaft 54. The third input gear 53 is located at the second extremity E22' of the tertiary shaft 54. The motor shaft 15 and the secondary shaft 44 extend parallel to each other. The second gear module G2 is arranged in a second gear casing (not shown) and the third gear module G3 is arranged in a third gear casing (not shown), the second and the third gear casings being adjacent. The second gear module G2 and the third gear module G3 are included in a gearbox G23. In an alternative embodiment, the first gear module G1 and the second gear module G2 are arranged in a common gear casing (not shown).

In this embodiment, EM2, the differential 10 and the gearbox G23 are arranged to obtain a transmission unit.

Typically, the motor EM2 is attached to the transmission housing by any appropriate means and in particular by bolting. Such fastening means are known as such, that is why they are not shown on the figures. Alternatively, the housing of the electric motor EM2 is integral with the transmission housing.

Advantageously, the first electric motor EM2 is offset from a longitudinal direction of the vehicle.

Preferably, the axis of rotation of electric motor EM2 is parallel to the longitudinal direction of vehicle. Accordingly, the powertrain 2b is said to be in a longitudinal configuration relative to the axle.

Gearbox G23 can include a coupling member 55 fitted on the input shaft 54, typically between the second and the third tertiary gears 52 and 53. The coupling member 55 is movable between a first position in which it couples the second tertiary gear 52 in rotation with tertiary shaft 54, a second position in which it couples the third tertiary gear 53 in rotation with tertiary shaft 54 and a neutral position in which it allows the second and third tertiary gears 52, 53 to rotate freely around the tertiary shaft 54.

Advantageously, a first speed ratio ("EM2 gear 2") is obtained when the coupling member 55 is in the second position. In this configuration, the torque is transmitted from the shaft 54 to the secondary shaft 44 through the pair of gears 53 and 43. This means that the rotation speed of gear 52 is independent from that of shaft 54. In other words, gear 52 is free to rotate around shaft 54. Nevertheless, it does not mean that gears 52 remains stationary. Gear 52 is rotationally driven by gear 42, which is fixed in rotation with shaft 44.

Advantageously, a second speed ratio ("EM2 gear 4") is obtained when the coupling member 55 is in the first position. In this configuration, the torque is transmitted from the shaft 54 to the secondary shaft 44 through the pair of gears 52 and 42. This means that the rotation speed of gear 53 is independent from that of shaft 54. In other words, gear 53 is free to rotate around shaft 54. Nevertheless, it does not mean that gear 53 remains immobile. Gear 53 is rotationally driven by gear 43 which is fixed in rotation with shaft 44.

Besides, a neutral point can be obtained when both 40 and 55 are each in neutral position.

The speed ratio of gearbox G23 can be defined as the quotient between the rotational speed of the output gear 46 and the rotational speed of gear 17. It is to be understood that gear shifting within the gearbox G23 is automatically achieved according to the vehicle speed.

Gearbox G23 is a two-speed gearbox, with a neutral point, in which no torque can be transmitted from the electric motor EM2 to the wheels W1 and W2.

A power take-off PTO is connected to the second electric motor EM2. As illustrated in FIG. 4, the power take-off PTO is located at the second extremity E22' of the tertiary shaft 54. For example, a gear may be arranged on the second extremity E22' of the tertiary shaft 54, said gear meshing with a gear of the PTO. For example, a coupling member, in particular a clutch, can be located between the power take-off PTO and the tertiary shaft 54.

FIG. 5 illustrates an example wherein the power take-off PTO is located at the second extremity E2' of the motor shaft 15. For example, a gear may be arranged on the second extremity E2' of the motor shaft 15, said rational gear meshing with a gear of the PTO. A coupling member, in particular a clutch, may be located between the power take-off PTO and the motor shaft 15.

Figure 6:
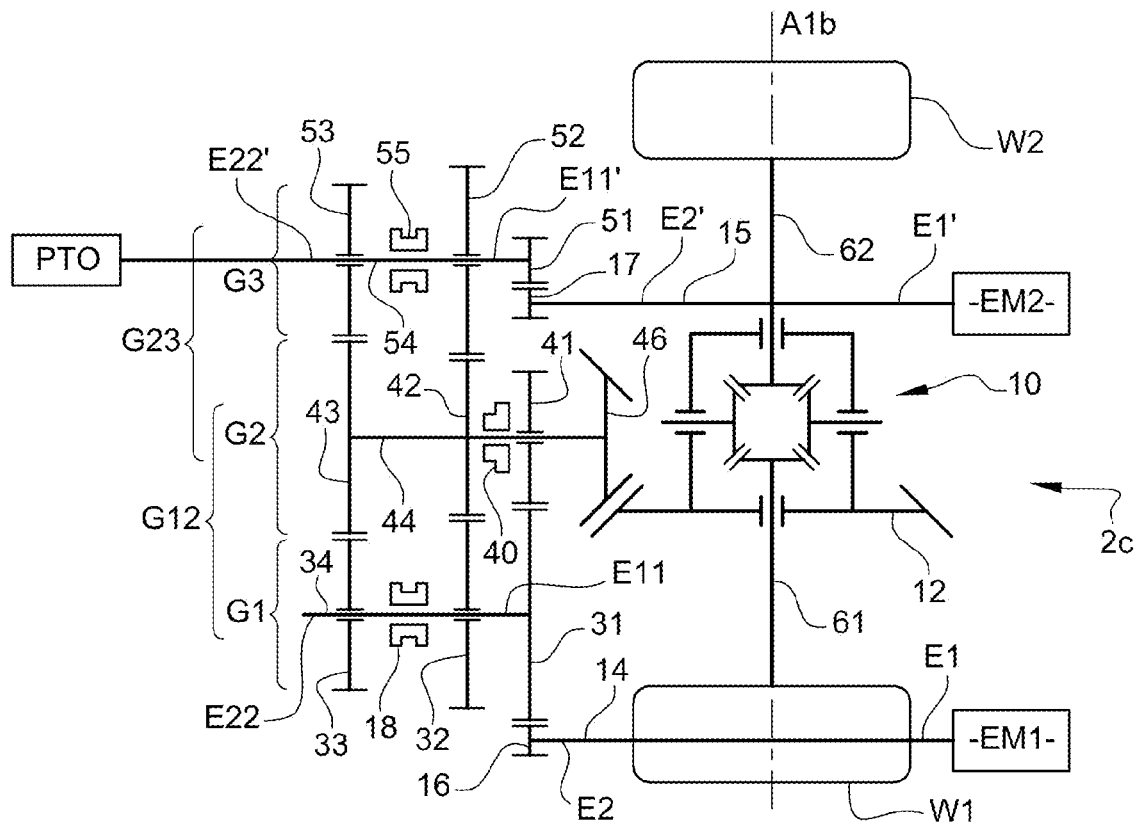
FIG. 6 is a schematic representation of the electric powertrain according to the one embodiment.
Figure 7:
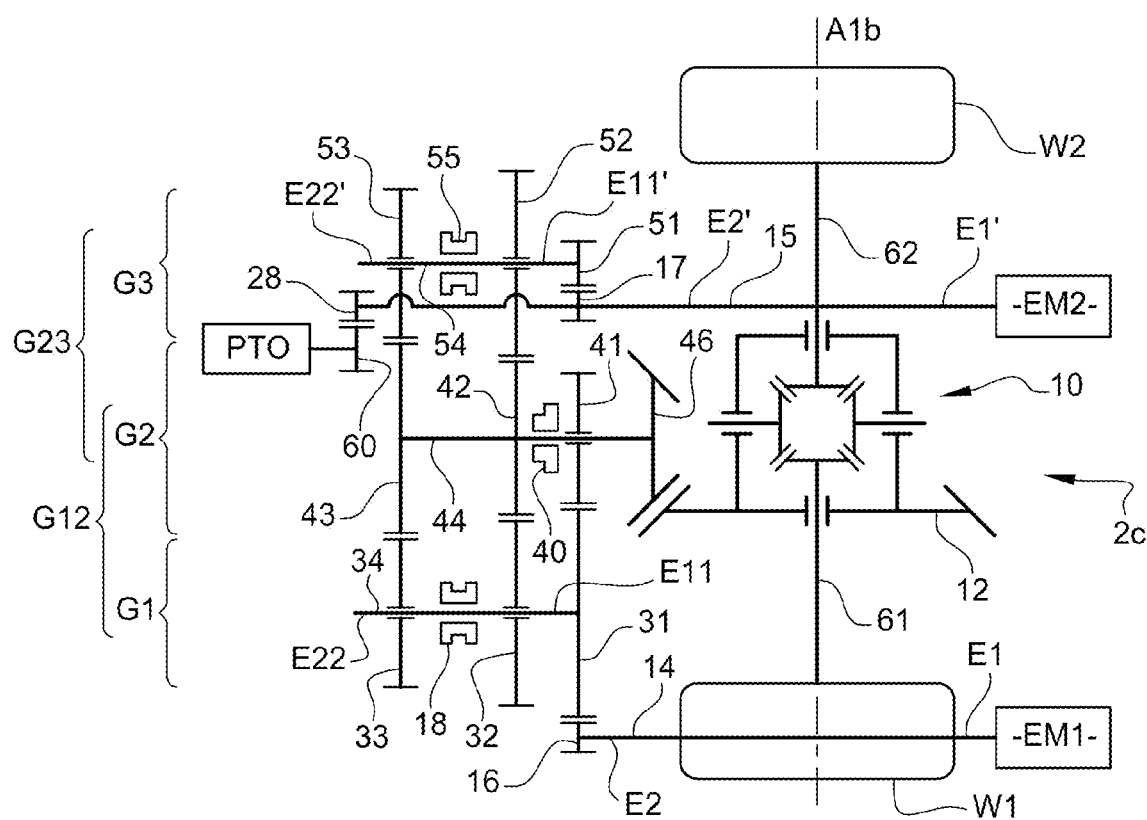
FIG. 7 is a schematic representation of the electric powertrain according to the one embodiment.
Figures 8, 9:
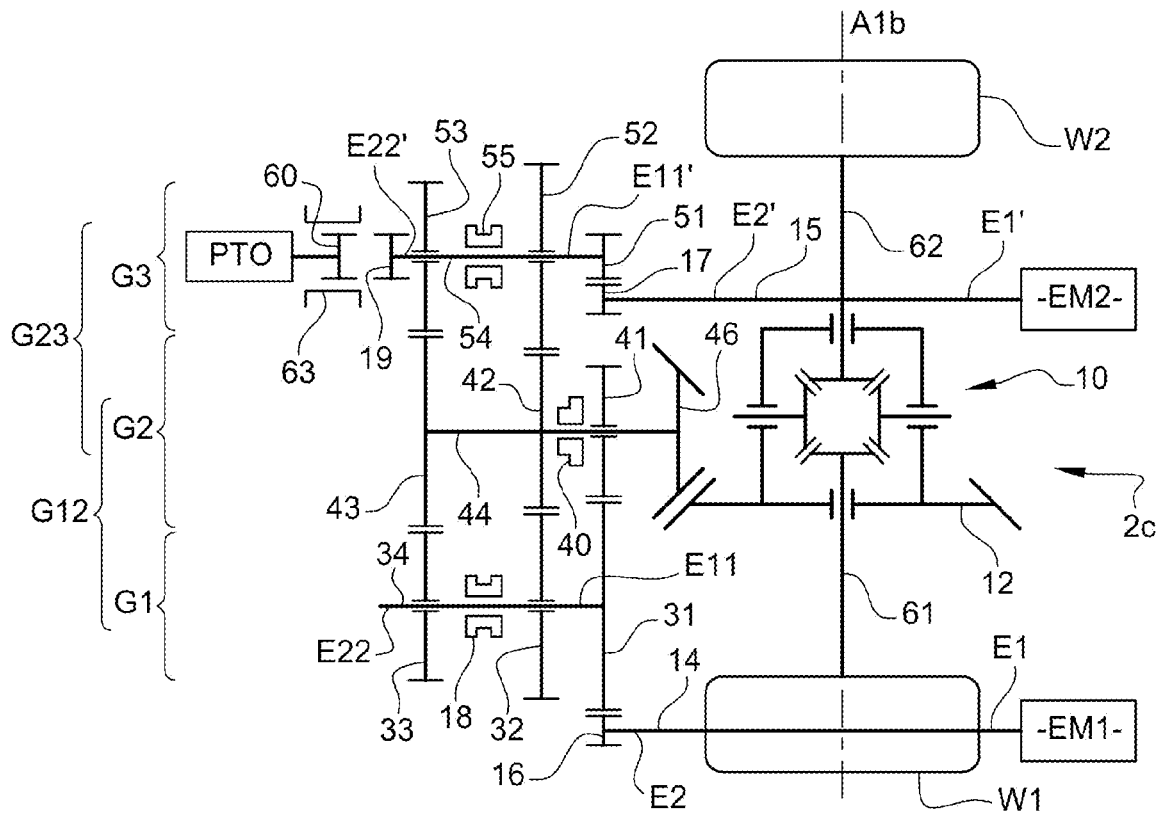
FIG. 8 is a schematic representation of the electric powertrain according to the one embodiment and FIG. 9 is a table summarizing all possible operating modes of the powertrain that is part of the E-axle.

As shown on FIGS. 6 to 8, in another embodiment, the invention relates to an electric powertrain 2c for a vehicle 1. In this embodiment, the two electric motors EM1 and EM2 are arranged transverse relative to the transversal direction of the vehicle, meaning that the axis of rotation of each motor EM1 and EM2 is perpendicular to the transversal direction of the vehicle. Accordingly, the powertrain 2c is said to be in a transverse configuration relative to the axle. The advantage of such transverse configuration is that it quite compact in the longitudinal side in comparison with a longitudinal configuration. To the contrary, a longitudinal arrangement requires less space in the transverse direction.

In this embodiment, EM1 linked to the first gear module G1, the second gear module G2 and EM2 linked to the third gear module G3 extend parallel to each other. The first gear module G1 is arranged in a first gear casing (not shown), the second gear module G2 is arranged in a second gear casing (not shown) and the third gear module G3 is arranged in a third gear casing (not shown). The first gear casing, the second gear casing and the third gear casing are adjacent. In an alternative embodiment, the first gear module G1, the second gear module G2 and the third gear module G3 are arranged in a common gear casing (not shown).

Preferably, the electric motors EM1 and EM2, the first gear module G1, the second gear module G2 and the third gear module G3 are encased inside the transmission housing. Alternatively, they could be outside of the transmission housing. In this case, the housing would include standard interfaces to assemble the electric motors EM1 and EM2.

Preferably, the electric motors EM1 and EM2 are powered by an electric power source, such as at least one battery or fuel cells, which are attached to another part of the vehicle, such as the chassis.

Besides, the crown wheel 12 and the output gear 46 are conical gears (also called bevel gear). In addition, the first secondary gear 41 is arranged between the second secondary gear 42 and the output gear 46 and gear 42 is between gears 41 and 43, meaning that the output gear 46 is typically arranged at the end of shaft 44. This specific configuration is particularly suitable to arrange another coupling element (not shown) between gears 42 and 43, as mentioned above.

A power take-off PTO is connected to the first EM1 or the second electric motor EM2. FIGS. 6 to 8 illustrate an embodiment wherein the power take-off PTO is connected to the second electric motor EM2. FIG. 6 illustrates an example wherein the power take-off PTO is located at the second extremity E22' of the tertiary shaft 54. FIG. 7 illustrates an example wherein the power take-off PTO is located at the second extremity E2' of the motor shaft 15. In this example, a rational gear 28 arranged on the second extremity E2' of the motor shaft 15 is meshing with a gear 60 of the PTO. A coupling member, in particular a clutch, may be located between the power take-off PTO and the motor shaft 15.

FIG. 8 illustrates an example wherein a rational gear 19 arranged on the second extremity E22' of the tertiary shaft 54 is meshing with a gear 60 of the power take-off PTO. A coupling member 63, in particular a clutch, may be located between the power take-off PTO and the tertiary shaft 54. In this embodiment, when the clutch 63 is opened, the tertiary shaft 54 is disconnected from the power take-off. The first EM1 and the second EM2 electric motors are connected to the wheels W1, W2 and allow the propulsion of the vehicle 1.

When the clutch 63 is closed and the coupling member 55 is the neutral position and the coupling members 18, 40 are in the first or the second position, the tertiary shaft 54 allows the motion of the power take-off PTO through the rational gear 19 meshing with the gear 60 of the power take-off. The second electric motor EM2 does not transfer torque to the secondary shaft 44 and therefore to the wheels W1, W2. In this embodiment, the vehicle 1 is still be motioned by the electric motor EM1. Indeed, the electric motor EM1 can still be mechanically linked to the secondary shaft 44 and therefore to the wheels W1, W2. Furthermore, the speed and the torque of the second electric motor EM2 is adapted perfectly to the power take-off PTO.

When the clutch 63 is closed and the coupling members 18, 40, 55 are in neutral position, the tertiary shaft 54 allows the motion of the power take-off PTO through the rational gear 19 meshing with the gear 60 of the power take-off. The second electric motor EM2 does not transfer torque to the secondary shaft 44 and therefore to the wheels W1, W2. In this embodiment, the vehicle 1 is at standstill and the PTO can be driven by both electric motors EM1 and EM2.

When the clutch 63 is closed and the coupling member 55 is in the first or the second position, the second electric motor EM2 is connected to the wheels W1, W2 allowing the propulsion torque of the vehicle 1 and the motion of the power take-off PTO is allowed. Thus, the vehicle 1 and the power take-off PTO are simultaneously in motion.

For the rest, the arrangement of the transmission represented on FIGS. 6 to 8 is identical to that of FIGS. 1-5.

FIG. 9 shows all possible combinations provided by all the electric powertrain 2a, 2b and 2c. On this figure, the column "cruise gear" represents the engagement status of the first coupling member 40. When the "cruise gear" is engaged, the second coupling member 18 (and the coupling member 55, if any) is or are preferably in neutral position. However, in a variant, the coupling member 55 could be engaged in the first or second position while the cruise gear is engaged, i.e. while the first coupling member 40 is in engaged state.

The combination 12 in FIG. 9 allows a mechanical disconnection between vehicle wheels and electric motors. It can be used in downhill conditions for instance to avoid electric energy recuperation from the motors to the battery when this is not needed. It could also be used to avoid parasitic losses between all the elements of the electric powertrain and consequently allows energy saving. A full neutral position also allows to tow the truck in case of an unplanned stop since truck are usually tow with the driving wheel still touching the ground and rotating.

Advantageously, EM2 and/or EM1 is(are) controlled by a control device (not shown), typical an ECU (not shown). EM2 and EM1 can be controlled simultaneously or independently from each other. The ECU may control both electric motors EM2, EM1 in a way that EM1 will provide required torque to the wheels whereas EM2 is switching gear and EM2 will provide required torque to the wheel whereas EM1 is switching gear. This configuration corresponds to a full powershift mode meaning that there is no torque interruption at all when switching gears. This full powershift effect allows better vehicle performance and enhances driving comfort.

Preferably, the transmission ratios of gearbox G23 are different from that of gearbox G12. Typically, the first speed ratio of G12 ("EM1 gear 1") is lower than the first speed ratio of G23 ("EM2 gear 2"), the first speed ratio of G23 ("EM2 gear 2") is lower than the second speed ratio of G12 ("EM1 gear 3") and the second speed ratio of G12 ("EM1 gear 3") is lower than the second speed ratio of G23 ("EM2 gear 4"). The third speed ratio of G12, or "gear cruising ratio", is higher than the second speed ratio of G23 ("EM2 gear 4").

All in all, the two gearboxes G12 and G23 form together a multi-input transmission, capable of selectively transmitting the torque of E-motor EM1 and the torque of E-motor EM2 (as inputs of the transmission) to the wheels, typically through the differential 10 (as output of the transmission).

It is to be understood that the present invention is not limited to the embodiments described above and illustrated in the drawings; rather, the skilled person will recognize that many changes and modifications may be made within the scope of the appended claims. The present invention provides compact electric powertrains depending on the vehicle needs. Thus, the architecture of the electric powertrain is adapted to any kind of vehicle. Furthermore, the architecture of the electric powertrains according to the present invention is optimized to include a power take-off and offers a better efficiency. Consequently, the electric powertrains according to the present invention allow for a reduction of the production costs, an increased productivity and a better efficiency.

The invention claimed is:

1. An electric powertrain for a vehicle, the electric powertrain being configured to provide electric propulsion of the vehicle and comprising:
   a transmission unit including a second electric motor, a differential and a gearbox, the gearbox comprising a second gear module and a third gear module,
   a second gear module including a secondary shaft on which are arranged a second secondary gear and a third secondary gear,
   the second electric motor being linked to the third gear module through a motor shaft having a first extremity and a second extremity, said third gear module including a tertiary shaft, having a first extremity and a second extremity, on which are arranged a first tertiary gear that does not mesh with any secondary gear, said first tertiary gear being located at its first extremity, a second tertiary gear that is meshing the second secondary gear and a third tertiary gear that is meshing with the third secondary gear, said third tertiary gear being located at its second extremity, a rotational gear meshing with the first tertiary gear being arranged on the second extremity of the motor shaft, said second tertiary gear and said third tertiary gear being adjacent,
   the differential being linked to the second electric motor, said electric powertrain being such that the second gear module and the second electric motor linked to the third gear module extend parallel to each other and such that a power take-off is connected to the second electric motor.

2. An electric powertrain for a vehicle, the electric powertrain being configured to provide electric propulsion of the vehicle comprising:
   a transmission unit includes a first electric motor, a second electric motor, a differential and a gearbox, the gearbox comprising a first gear module, a second gear module and a third gear module,
   the first electric motor being linked to the first gear module through a motor shaft having a first extremity and a second extremity, said first gear module including a primary shaft, having a first extremity and a second extremity, on which are arranged a first primary gear, located at its first extremity, which is fixed in rotation with respect to the primary shaft, a second primary gear and a third primary gear, said third primary gear being located at its second extremity,
   a secondary shaft being linked to the second gear module including a secondary shaft on which are arranged a first secondary gear that is meshing with the first primary gear, a second secondary gear meshing with the second primary gear and a third secondary gear meshing with the third primary gear,
   the second electric motor being linked to the third gear module through a motor shaft having a first extremity and a second extremity, said third gear module including a tertiary shaft, having a first extremity and a second extremity, on which are arranged a first tertiary gear that does not mesh with any secondary gear, said first tertiary gear being located at its first extremity, a second tertiary gear that is meshing the second secondary gear and a third tertiary gear that is meshing the third secondary gear, said third tertiary gear being located at its second extremity, a rotational gear meshing the first tertiary gear being arranged on the second extremity of the motor shaft, said second tertiary gear and said third tertiary gear being adjacent,
   the differential being shared by both electric motors, said electric powertrain being such that the first electric motor linked to the first gear module, the second gear module, and the second electric motor linked to the third gear module extend parallel to each other and such that a power take-off is connected to the first electric motor or the second electric motor.

3. The electric powertrain for a vehicle according to claim 2, wherein the power take-off (PTO) is located at the second extremity of the primary shaft.

4. The electric powertrain for a vehicle according to claim 3, wherein a rational gear arranged on the second extremity of the primary shaft is meshing with a gear of the PTO.

5. The electric powertrain for a vehicle according to claim 2, wherein a coupling mean is located between the power take-off and the primary shaft.

6. The electric powertrain for a vehicle according to claim 2, wherein the power take-off is located at the second extremity of the motor shaft.

7. The electric powertrain for a vehicle according to claim 6, wherein a rational gear arranged on the second extremity of the motor shaft is meshing with a gear of the PTO.

8. The electric powertrain for a vehicle according to claim 2, wherein a clutch is located between the power take-off and the motor shaft.

9. The electric powertrain for a vehicle according to claim 1, wherein the power take-off is located at the second extremity of the tertiary shaft.

10. The electric powertrain for a vehicle according to claim 9, wherein a rational gear arranged on the second extremity of the tertiary shaft is meshing with a gear of the PTO.

11. The electric powertrain for a vehicle according to claim 1, wherein a coupling member is located between the power take-off and the tertiary shaft.

12. The electric powertrain for a vehicle according to claim 1, wherein the power take-off is located at the second extremity of the motor shaft.

13. The electric powertrain for a vehicle according to claim 12, wherein a rational gear arranged on the second extremity of the motor shaft is meshing with a gear of the PTO.

14. The electric powertrain for a vehicle according to claim 1, wherein a clutch is located between the power take-off and the motor shaft.

* * * * *